(12) United States Patent
Hobbs

(10) Patent No.: US 6,422,083 B1
(45) Date of Patent: Jul. 23, 2002

(54) TUNED ENERGY REDISTRIBUTION SYSTEM FOR VIBRATING SYSTEMS

(76) Inventor: Gregg K. Hobbs, 4300 W. 100th Ave., Westminster, CO (US) 80031

( * ) Notice: Subject to any disclaimer, the term of this patent is extended or adjusted under 35 U.S.C. 154(b) by 0 days.

(21) Appl. No.: 09/536,188

(22) Filed: Mar. 24, 2000

(51) Int. Cl.$^7$ ................................................. G01M 7/00
(52) U.S. Cl. ......................................... 73/663; 73/1.82
(58) Field of Search .......................... 73/662, 663, 665, 73/666, 667, 668, 1.82; 702/113, 104, 105

(56) References Cited

U.S. PATENT DOCUMENTS 5,979,242 A * 11/1999 Hobbs ........................ 73/663

* cited by examiner

Primary Examiner—Helen Kwok
(74) Attorney, Agent, or Firm—Patton Boggs LLP

(57) ABSTRACT

The tuned energy redistribution system is used to precisely control the amplitude of vibrations in a vibrating system. The vibrating system typically has a resonant frequency or other vibration frequency modes that are either undesirable or of excessive amplitude. The present tuned energy redistribution system functions to redistribute the vibrational energy from these undesirable frequencies to other selected frequencies, such as by spreading the vibration frequencies out over a wide band of frequencies. The tuned energy redistribution comprises vibration input elements and/or vibration shaping elements that collectively function to enable the user to program the frequency and magnitude of the vibrations that are produced by the vibrating system. This energy redistribution is typically accomplished by providing tuned absorbers, consisting of a vibrating mass and a vibration stop, which shape the frequency response of the vibrating system by responding to frequencies mostly near their natural frequency of vibration and then, when the response displacement is sufficient, provide a vibration input by impacting the element in the vibrating system to which they are connected via the vibration stop, causing broad band vibration to be generated by the series of impacts.

20 Claims, 4 Drawing Sheets

TUNED ENERGY REDISTRIBUTION SYSTEM FOR VIBRATING SYSTEMS

CROSS-REFERENCE TO RELATED APPLICATIONS

This application is related to U.S. patent application Ser. No. 09/063,157, titled "Multi-Level Vibration Test System Having Controllable Vibration Attributes", now issued as U.S. Pat. No. 5,979,242.

FIELD OF THE INVENTION

This invention relates to vibrating systems and to a tuned energy redistribution system for use in a vibrating system to precisely control the amplitude of vibrations in the vibrating system.

PROBLEM

It is a problem in the field of vibrating systems to control the amplitude of vibrations that are present in such a system. One such vibrating system consists of a mass of predefined shape and extent that responds to a series of impulses by vibrating as a function of the characteristics of the mass, the frequency and magnitude of the impulses, and the location of the site at which the impulses are imparted. The computation of the characteristic response of the mass can be difficult, especially in the presence of random impulses. There are many such instances of vibrating systems and problems occurring in vibrating systems, such as: axle hop on a motor vehicle caused by a corduroy road; or axle trounce in a motor vehicle caused by extreme acceleration where the springs wind up, the axle and tires rapidly rotate, followed by the tires regaining traction, and the process repeats; or in a steel mill where extruded semi-liquid steel vibrates as it is output from the furnace causing irregularities in the steel; or in an air-conditioner compressor vibration during start up. These systems have excess vibration at a particular frequency and in a particular direction.

This undesirable vibration problem is particularly significant in vibration test systems which are used to ensure that the conditions that a product encounters during shipping, installation and use do not cause it to fail in its operation. One reason for this problem is that it is impossible to reproduce these real world conditions in a laboratory environment. The laboratory equipment that is used for testing include vibration systems, commonly known as shaker tables, that emulate the vibration conditions encountered by the product. Unfortunately, these systems are not presently able to be selectively activated at a precisely defined vibration amplitude and frequency response. It is also common to locate the shaker table within a thermal chamber to incorporate thermal cycling of the product into the vibration test.

The basic shaker table includes a platform upon which the product is mounted. The platform is supported on flexible supports that permit the vibration of the table freely in all directions, independent of the environment. The shaker table generates vibration in six axes by providing either pneumatically driven or mechanically driven actuators, termed exciters or vibrators, that produce an impact to initiate the vibrations. The platform couples the vibrations from the actuators to the product. The typical actuator is an impact device that produces forces of high magnitude but very short duration, typically driven by air pressure. There are two effects that result from this input: the repeated impacts generate a line spectrum (equally spaced lines) in the spectral density domain, the shaker table is set into a quasi-resonance condition and all of its modes of vibration are excited. As a result, the spectral density of the shakers is not uniform and can vary by six or more decades. These variations are unacceptable for highly accelerated testing or for simulation applications.

The physical properties of the shaker table components cause the shaker table to respond to the different frequencies in the impact spectrum in different ways. The physical properties of the shaker table components typically resonate with certain vibration frequencies and suppress other vibration frequencies to result in selected modes of vibration. For example, resonation results in the vibrations remaining for a relatively long time compared to the duration of the input pulse, while suppression results in the quenching of the vibration in a relatively short time. The modes of vibration of the shaker table which are excited are also a function of the location, orientation and nature of the actuators as well as the dimensions and properties of the platform. Thus, by designing the shaker table to have relatively low resonant frequencies, the spectral response of the system can be shifted to fill up the low frequency end of the spectrum, but there is a tendency to have significant variation in spectral density.

This shaker table architecture is well known and the great difficulty facing the test engineers in this field is the implementation of the shaker table in a manner to precisely produce the desired vibration conditions in terms of the presence of selected vibration frequencies and regulation of their magnitude. There are obviously numerous variables, each of which affects the magnitude and frequency of the vibrations that are produced. These variables include but are not limited to: number of actuators, actuator placement, actuator characteristics, frequency of actuator operation, physical coupling of the actuator to the shaker table platform, coupling of the product to the shaker table platform, damping elements included in the shaker table, dimensions of the shaker table, shaker table implementation, including materials and intervening structures. A further complicating factor is that these variables can also be interactive, in that the variation of one variable can impact the effects produced by another variable. Thus, the design of a shaker table is a non-trivial task and typically represents a compromise that produces a crude emulation of the desired vibration characteristics. The quest for accuracy in this field is ongoing and has been relatively unsuccessful to date.

Thus, while there exist numerous variations of shaker tables, each implementation presents limitations that prevent the test engineer from effecting precise control over the vibration frequencies and magnitudes to thereby precisely emulate the environment that the product under test will encounter or the environment desired for simulation or stimulation.

SOLUTION

The above described problems are solved and a technical advance achieved by the present tuned energy redistribution system for a vibrating system to precisely control the amplitude of vibrations in a vibrating system. The vibrating system typically has a resonant frequency or other vibration frequency modes that are either undesirable or of excessive amplitude. The present tuned energy redistribution system functions to redistribute the vibrational energy from these undesirable frequencies to other selected frequencies, such as by spreading the vibration frequencies out over a wide band of frequencies. The present tuned energy redistribution system functions in any vibrating system and is of particular significance in the field of vibration test systems.

The present tuned energy redistribution enables a test engineer in the field of vibration test systems to precisely implement a vibration environment that is applicable to a wide range of applications and performance characteristics. The tuned energy redistribution system comprises vibration input elements and/or vibration shaping elements that collectively function to enable the user to program the frequency and magnitude of the vibrations that are produced by the vibration test system. This energy redistribution is accomplished by providing tuned absorbers, consisting of a vibrating mass and a vibration stop, which shape the frequency response of the vibrating system by responding to frequencies mostly near their natural frequency of vibration and then, when the response displacement is sufficient, provide a vibration input to the system by impacting the element in the vibrating system to which they are connected via the vibration stop, causing broad band vibration to be generated in the system by the series of impacts.

For a vibration test system which produces random vibrations to test the vibration resilience of products mounted on a shaker table, the tuned energy redistribution system is tuned to a resonant frequency that matches that of the shaker table/product under test or any other frequency where the spectral density is too high. The tuned energy redistribution system absorbs energy at its own resonant frequency and the response builds up until the vibrating or rotating mass within the tuned energy redistribution system hits the stop and an impulse is given to the shaker table. A single impulse generates an infinite series of line spectra in the frequency domain as defined by a Fourier analysis. An irregularly timed series of impulses generates a series of infinite series of line spectra in the frequency domain. Thus, energy is extracted from the system by the tuned energy redistribution system at the resonant frequency of the energy redistribution system and then redistributed over a very broad bandwidth which is determined by the stiffness of the programmer on the mass and/or stop. A very stiff programmer generates a very broad spectrum and a very soft programmer generates a narrow spectrum. Since pneumatic impactors are very weak in low frequencies, a resonance in the shaker table can be redistributed to the low frequencies by the use of a soft programmer, while a stiff programmer generates a very broad bandwidth of spectral lines. Thus, the tuned energy redistribution system can reduce resonances and fill in the low frequency end of the spectrum and, by design, the high frequency end of the spectrum can also be filled.

DETAILED DESCRIPTION

Prior Art Untuned & Tuned Dampers

In the field of vibration control, both tuned and untuned dampers are well known. Untuned dampers change elastic strain energy into heat by one or more means. In one typical application, a mass is attached to a crankshaft via a fluid coupling or by a frictional coupling. When the crankshaft angular velocity increases or decreases, the mass continues in motion and generates a force in a direction that is opposite to the change. Energy is lost due to heat generated and then transferred to the surroundings. This reduces torsional vibrations that would fatigue the crankshaft.

In tuned dampers, the operation is not truly damping, but the operation of the tuned damper simply changes the dynamic response of the overall system by changing the resonant frequencies of the overall system. This effectively reduces the resonance of the overall system at the selected frequency by making that frequency not a resonant frequency. In the crankshaft example used above, a tuned damper is implemented as a pendulum attached to the crankshaft, with the centrifugal force, as it varies with rotational speed, causing the pendulum to swing back and forth. The damper stays tuned to the disturbances caused by disruptive forces in the crankshaft, and are self-tuning.

Figure 5:
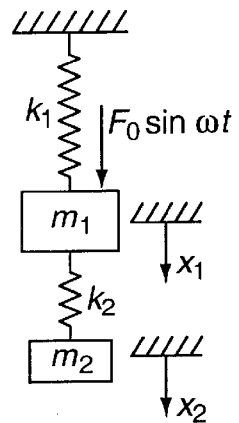
FIG. 5 illustrates a typical prior art spring-mass system with an attached tuned absorber.

A classic example of a tuned damper system is shown in FIG. 5, where the single degree of freedom damper spring-mass system $k_2$, $m_2$ is connected to the primary spring-mass system $k_1$, $m_1$ and is tuned to the frequency of the exciting force, such that vibrations at $\omega^2 = k_2/m_2$ cause the damper spring-mass system to act as a vibration damper. In operation, the primary spring-mass system $k_1$, $m_1$ is forced to vibrate under the harmonic excitation $F=F_0 \sin \omega t$. With the tuned damper spring-mass system attached to this primary spring-mass system, the configuration becomes a two-degrees-of-freedom system whose equations of motion are:

$$m_1\ddot{x}_1 = k_2(x_2-x_1) - k_1 x_1 + F_0 \sin \omega t$$

$$m_2\ddot{x}_2 = -k_2(x_2-x_1)$$

Making the following substitutions:

$$\omega_{11} = \sqrt{k_1/m_1}$$

$$X_0 = F_0/k_1$$

$$\omega_{22} = \sqrt{k_2/m_2}$$

and assuming that the solution to the forced vibration problem to be:

$$x_1 = X_1 \sin \omega t$$

$$x_2 = X_2 \sin \omega t$$

the equations in terms of the amplitudes of vibration of the two spring-mass systems become:

$$\left[1 + \frac{k_2}{k_1} - \left(\frac{w}{w_{11}}\right)^2\right] X_1 - \left(\frac{k_2}{k_1}\right) X_2 = X_0$$

$$-X_1 + \left[1 - \left(\frac{w}{w_{22}}\right)^2\right] X_2 = 0$$

The behavior of the overall system may be studied by examining the expressions for the amplitude of the two masses:

$$\frac{X_1}{X_0} = \frac{[1-(w/w_{22})^2]}{\left[1+\frac{k_2}{k_1}-\left(\frac{w}{w_{11}}\right)^2\right]\left[1-\left(\frac{w}{w_{22}}\right)^2\right]-\frac{k_2}{k_1}}$$

$$\frac{X_2}{X_0} = \frac{1}{\left[1+\frac{k_2}{k_1}-\left(\frac{w}{w_{11}}\right)^2\right]\left[1-\left(\frac{w}{w_{22}}\right)^2\right]-\frac{k_2}{k_1}}$$

Figure 6:
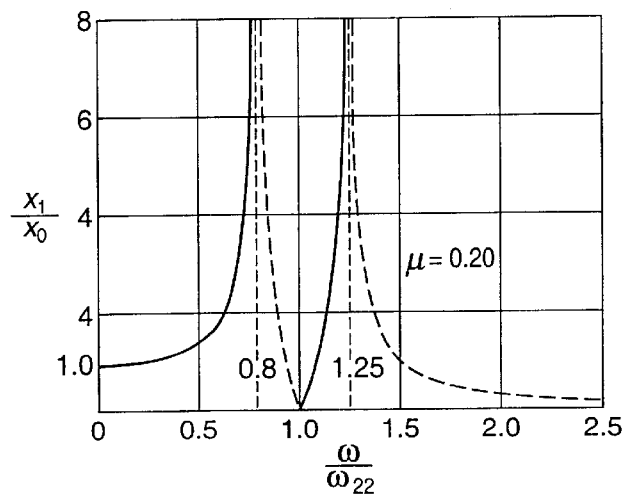
FIG. 6 illustrates in graphical form the amplitude of vibration of the main mass in the system of FIG. 5 as a function of frequency.

It is evident from these equations that the vibration amplitude $X_1$ of the mass 1 at the point of attachment of the damping spring-mass system becomes zero when the exciting frequency $\omega$ coincides with the natural frequency $\omega_{22}$ of the damping spring-mass system. For this frequency, the vibration amplitude $X_2$ of the mass 2 is equal to:

$$X_2 = -(k_1/k_2)X_0 = -F_0/k_2$$

where the negative sign indicates that the vibration amplitude $X_2$ is out of phase with the impressed force applied to the primary spring-mass system. In fact, the vibration amplitude $X_1$ becomes zero at this frequency simply because the force $k_2X_2$ exerted by spring 2 on mass $m_1$ is equal and opposite to the impressed force $F_0$. This is the basis of the vibration damper. The size of the damper mass depends on the magnitude of the disturbing force that is to be canceled since the damper must exert a force equal in magnitude and opposite in direction to the disturbing force. The disturbing force itself is a function of the allowable deformation of the damper spring. However, as shown in FIG. 6, there are also two frequencies at which the amplitude of vibration of the primary mass becomes infinite due to the effects of the damper. Therefore, the vibration damper can be used only when the disturbing frequency is constant, since the damping spring-mass system is effective only at the natural frequency of the damping spring-mass system. While the concept of tuning a damping spring-mass system appears simple, the practical considerations make it difficult to exactly tune any system. As noted, if the damping mass is of incorrect size or the coupling of the damping spring-mass system to the primary spring-mass system is incorrect, the damping spring-mass system may come into resonance with the exciting force of the primary system. Dynamic dampers are generally used where the primary system without the damping spring-mass system is nearly in resonance with the excitation. If the natural frequency of the primary system is less than the forcing frequency, then it is preferable to tune the dynamic damping spring-mass system to a frequency slightly lower than the forcing frequency to avoid the resonance that lies above the natural frequency of the primary system. Likewise, if the natural frequency of the primary system is greater than the forcing frequency, then it is preferable to tune the dynamic damping spring-mass system to a frequency slightly greater than the forcing frequency to avoid the resonance that lies below the natural frequency of the primary system.

Figure 7:
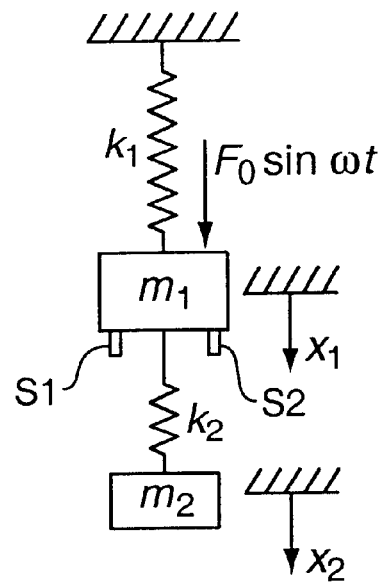
FIG. 7 illustrates a spring-mass system with an attached tuned energy redistribution system that is equipped with a stop.

FIG. 7 illustrates a spring-mass system of the type shown in FIG. 5 with an attached tuned energy redistribution system that is equipped with a stop S1, S2. The single degree of freedom damper spring-mass system $k_2$, $m_2$ is connected to the primary spring-mass system $k_1$, $m_1$ and is tuned to the frequency of the exciting force, such that vibrations at $\omega^2 = k_2/m_2$ cause the damper spring-mass system to act as a vibration damper. In operation, the primary spring-mass system $k_1$, $m_1$ is forced to vibrate under the harmonic excitation $F = F_0 \sin \omega t$. When the tuned damper spring-mass system is attached to this primary spring-mass system, the configuration becomes a two-degrees-of-freedom system whose equations of motion are described above with respect to the system of FIG. 5. The spring-mass system with an attached tuned absorber that is equipped with a stop operates in a dual mode paradigm wherein the tuned energy redistribution system operates as a tuned absorber until the mass $m_2$ strikes the stop S1, S2 which may be coated with an optional programmer. At this time, a nearly elastic impact and rebound occurs. The impact of the mass $m_2$ striking the vibration stop S1, S2 supplies a pulse input to the point of attachment of the stop S1, S2 to the mass $m_1$ and changes the velocity of the mass $m_1$ with a relatively small loss of relative velocity. The pulse shape generated by this impact determines the bandwidth of the resulting vibration in the mass $m_1$ that was struck by the mass $m_2$.

While the operation of the tuned energy redistribution system appears straightforward, a precise mathematical analysis of the tuned energy redistribution system is impractical or even impossible. This is due to the fact that a series of impacts, spaced apart in time at regular intervals can be represented by a series of spectral lines in the frequency domain, with an infinite series of spectral lines in the frequency domain being obtained when the distances between the input pulses goes to infinity. In operation, the dynamic response of the tuned absorber mode of operation of the tuned energy redistribution system can be characterized using linear theory until an impact occurs. At this point, the computations change to represent the impulse nature of this impact. The impact of the mass $m_2$ is small in magnitude because the change in vibrational displacement of the mass $m_2$ in the cycle in which contact occurs is only due to the change in vibrational displacement over the last cycle. Using impulse-momentum theory, the changes in velocities in the mass $m_1$ and mass $m_2$ can be calculated. The mass $m_2$ and the mass $m_1$ both experience an impulsive change in velocity, which is difficult to compute in the case of the mass $m_1$. The mass $m_1$ and the tuned energy redistribution system both revert to a normal vibration mode until another impact occurs.

Vibration Test Systems

The field of vibration test systems uses the concept of controllably generating vibrations of predetermined frequency and magnitude to emulate the vibration conditions encountered by a product during its life cycle to determine whether the product is susceptible to failure due to vibration. There are numerous vibration test modes that are used in the vibration test industry. Among these are the Highly Accelerate Life Tests (HALT) that use very high levels of vibration excitation to excite all modes of vibration in the product under test in order to find design and process weak links. Additionally, Highly Accelerated Stress Screens (HASS) comprise vibration tests that use high levels of excitation to find process problems. What is needed for general HALT and HASS vibration applications is a vibration test system that generates low frequency (0–200 Hz) vibrations for some applications, high frequency (200–10,000 Hz) vibrations for other applications and broad band vibration frequencies (0–10,000 Hz) for still other applications.

Typical Interconnection of Two Shaker Modules

Figure 1:
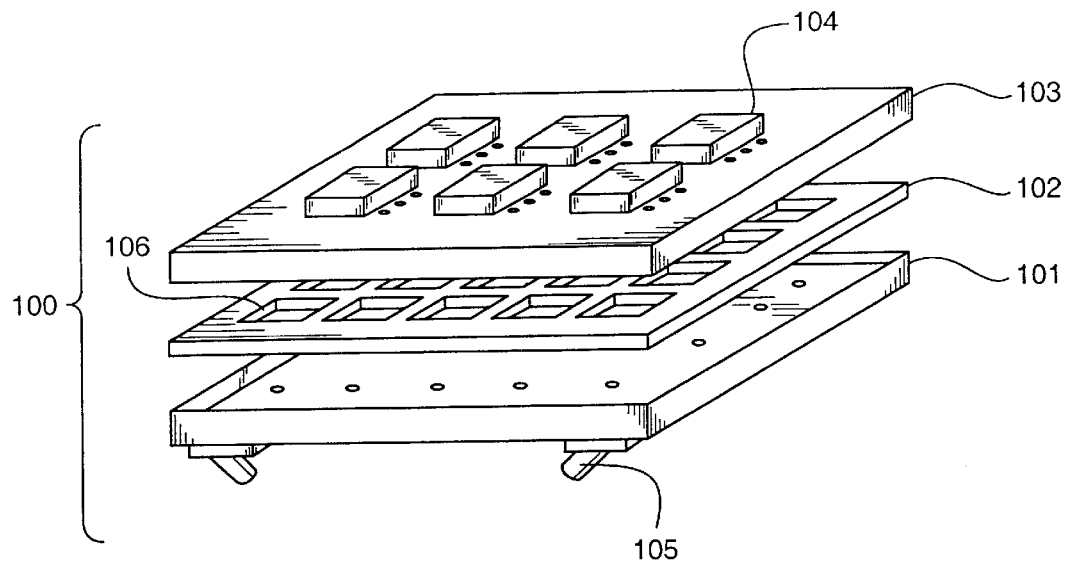
FIG. 1 illustrates in block diagram form an exemplary interconnection of two shaker modules.

FIG. 1 illustrates in block diagram form the overall architecture of a typical multi-level vibration test system 100 that consists of the interconnection of two shaker modules 101, 103. This multi-level vibration test system 100 is used herein to illustrate the concept of the invention and the extension to multiple layers (>2) and multiple shaker modules (>1) per layer represents a logical extension of the operation of the embodiment illustrated in FIG. 1. In addition, the following description also provides an illustration of the concept of the invention in a more general application to vibrating systems.

The multi-level vibration test system 100 uses a "primary" shaker module 101 that is a low frequency six (or less) axis vibration system excited by actuators 105 comprising pneumatics, servo-hydraulics, electro-dynamics or mass imbalance, to which is coupled a "secondary" shaker module 103. The two shaker modules 101, 103 are interconnected by a coupling module 102 that comprises springs, pneumatic or elastomeric elements. If the primary shaker module 101 is hydraulically or pneumatically powered, the oil column or air column resonance provides a spring effect. The secondary shaker module 103 can be directly coupled to the primary actuators 105 or by springs as well. The actuators 105 can be implemented by means of well-known elastomeric or pneumatic elements. The springs are described herein since they tend to limit the vibration transfer to only the lower frequencies since the mass of the secondary shaker module 103 as mounted on the springs behaves like a mass on a spring excited by base excitation. This architecture provides a vibration resonance at a natural frequency while isolating the secondary shaker module 103 from frequencies above the square root of two times the resonant frequency. The transmissibility (ratio of response to input in the amplitude and frequency domain) below the resonant frequency is greater than unity, is a maximum at the resonant frequency and then rolls off to provide isolation from the base inputs higher than the square root of two times the resonant frequency.

The secondary shaker module 103, which loan be thought of as a plate or fixture on which the product under test 104 is mounted, is equipped with apparatus that provides a direct excitation to the suspended secondary shaker module 103. This additional excitation can be inertially induced in the following ways: 1) attach pneumatic actuators to the secondary shaker module 103 and provide impacts which are shaped in the time domain by programmers, 2) provide imbalanced rotating parts and 3) provide a series of impacts by mechanical means such as masses impacting on the table, 4) provide tuned absorbers which respond to frequencies mostly near their natural frequency and then, when the response displacement is sufficient, impact the secondary shaker module 103 causing broad band vibration to be generated by the series of impacts.

The high frequency portion of the excitation to the product under test is provided by the secondary shaker module 103 being directly excited and is effectively isolated from the primary shaker module 101 by the fact that the primary spring/mass system noted above has a reasonably low natural frequency. The low frequency portion of the excitation to the product under test is principally due to the primary shaker module 101, with the low frequency vibrations being transmitted to the secondary shaker module 103 through the coupling module 102. Thus, each of the modules 101–103 is used to produce a segment of the overall vibration frequency spectrum, thereby enabling the test engineer to optimize the implementation of a selected module to produce only a portion of the vibration frequencies, rather than having to implement all of the vibration frequencies in a single module. This concept is extensible to the use of additional modules that are used to implement the multi-level vibration test system 100. Furthermore, the test engineer has available programmer elements that can be used in the primary shaker module 101, the coupling module 102, the secondary shaker module 103 to shape the characteristic response of each of these elements to thereby precisely control the overall vibration frequency spectrum that is produced by the multi-level vibration test system 100.

Primary Shaker Module

The primary shaker module 101 comprises a plate to which is attached at least one and more likely a plurality of actuators 105 that provide the energy input to create the vibration frequency spectrum for the primary shaker module 101. The primary shaker module 101 is typically supported by flexible supports that provide multi-directional freedom of movement over a predetermined range of motion. The actuators 105 are attached to the plate of the primary shaker module 101 in various selected orientations to generate multi-axial and multi-directional vibrations in the plate. Springs can be added between the plate and the primary excitation system to thereby add low frequencies to high frequencies. The primary shaker module 101 can also be supported directly by pneumatic or hydraulic actuators. This basic architecture of the primary shaker module 101 is similar to that used by existing shaker table systems.

Secondary Shaker Module

The secondary shaker module 103 comprises a plate that is used to mount the product under test 104 and to which can be attached to at least one and more likely a plurality of actuators that provide the energy input to create the vibration frequency spectrum for the secondary shaker module 103. The actuators can be connected between the secondary shaker module 103 and the coupling module 102, and/or between the secondary shaker module 103 and the primary shaker module 101, and/or directly connected to the secondary shaker module 103. Alternatively, the tuned energy redistribution system can either also be used to shape the response of this module absent any active actuators or can be used in conjunction with active actuators.

Coupling Module

The coupling module 102 comprises an instrumentality that functions to transmit the vibration frequencies generated by the primary shaker module 101 to the secondary shaker module 103, typically with the additional input of shaping the vibration frequency spectrum that is transmitted. Thus, the coupling module 102 can comprise any individual element or combination of elements that are known in the vibration test system technology that performs the desired vibration transmission and shaping functions. The coupling module 102 can be a substantially rigid structure or a flexible structure, depending on the nature of the vibration coupling and shaping that is desired. For example, the coupling module 102 can be implemented by a honeycomb element that is comprised of a plurality of chambers 106 that are formed by the use of vertically oriented walls that interconnect an upper plate with a lower plate. The vertically oriented walls are typically formed of a rigid material, to provide a dynamically stiff coupling between the upper and lower plates over a frequency range of interest. The chambers that are formed can be uniform in dimensions or can vary over the extent of the length and width of the upper and lower plates. Thus, the degree of coupling between the upper and lower plates can vary over the cross-section of the coupling module 102.

Vibration Isolation

In addition to the vibration coupling function of the coupling modules, these modules can be designed to isolate vibrations of undesirable frequencies. The proper design of a spring or isolator element can significantly reduce the vibratory forces that are generated. For example, if a source generates a force of amplitude $F_s = F \sin \omega t$, the force that is transmitted through a spring and damper system that has a spring constant of k and a damper coefficient of c is given by the following equation:

$$F=\sqrt{(kX)^2+(c\omega X)^2}$$

Where X is the amplitude of the vibration that is developed in response to the exciting force. Where the natural vibration frequency of this system is $\omega_n$, the transmissibility ($F/F_s$) of the force that is generated by the exciting source becomes less than unity when the ratio of the angular velocity of the source to the natural vibration frequency is greater than $\sqrt{2}$.

Given this characteristic, it becomes a problem to isolate low frequency disturbances, since the spring must then have a large static deflection to account for the disturbance. An alternative damping system comprises an air spring which comprises a bellows that are controlled by an air source connected thereto and storing a volume V of air at a pressure P. An air spring has a very low natural frequency and can effectively damp low frequency disturbances with only a small static displacement of x. If it is assumed that the bellows is a piston in a cylinder of area A, then $dV/dx=-A$. Likewise, the spring stiffness k is equal to the force per unit f displacement, which is given by $k=A(dP/dx)$. Thus, in an air spring system, the spring stiffness is dependent on the displacement of the piston and is therefore nonlinear. However, the displacement is minimal and the spring stiffness is approximately $\gamma PA^2/V$ where the constant $\gamma$ is equal to 1.4 and is the specific heat for air. A very soft spring can therefore be created by increasing the volume of the system by means of an air storage tank connected to the bellows. If damping is desired in this system, a valve can be installed in the air line that connects the air storage tank with the bellows. This example of a spring system represents one of the many spring and damper embodiments that can be used with the multi-level vibration test system 1.

Architecture of Alternative Tuned Energy Redistribution Systems

Figure 2:
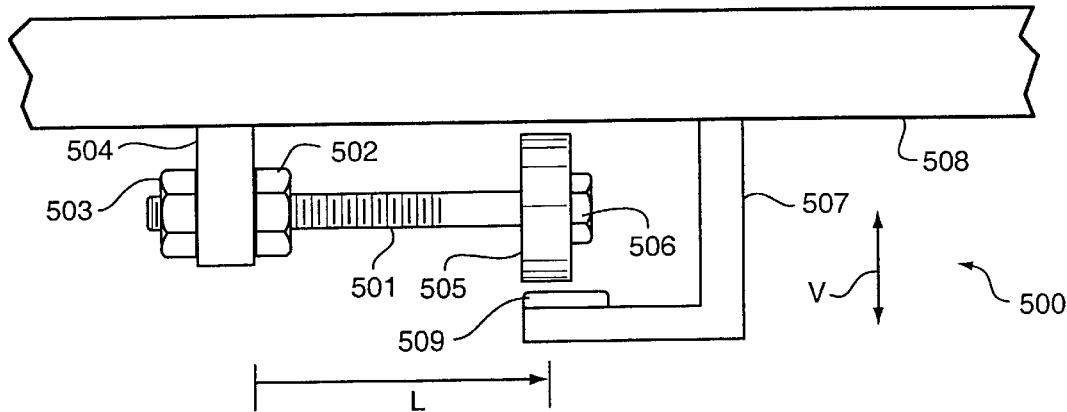
FIGS. 2 and 3 illustrate cross-section views of two embodiments of tuned energy redistribution system.
Figure 3:
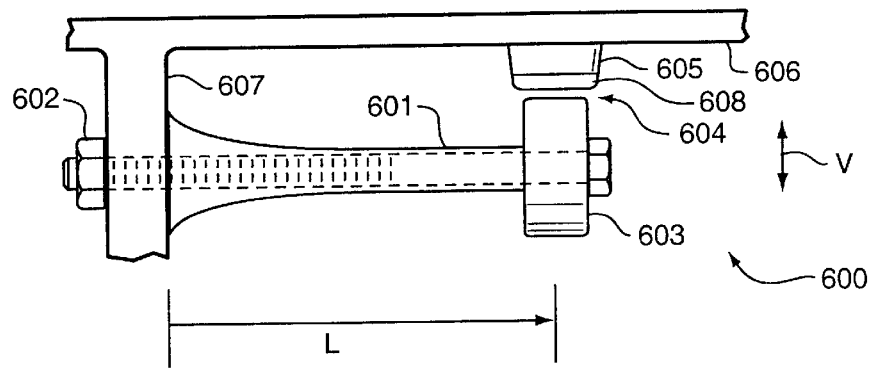

FIGS. 2 and 3 illustrate cross-section views of two embodiments of tuned energy redistribution systems that can be used to adjust the vibration frequency spectrum of the plate that is used to implement the primary shaker module 101, or secondary shaker module 103. The use of the tuned energy redistribution systems enable the test engineer to select the vibration frequencies that are produced and the table therefore has adjustable bandwidth and vibration spectrum.

In particular, as shown in FIG. 2, the tuned energy redistribution system 500 comprises the combination of an adjustable beam 501 and vibration stop 507 that are directly connected to the plate 508. The plate 508 transmits energy that is received from the actuators 105 (and/or the coupling module 102 or from additional vibration inputs from sources directly mounted on plate 508) and, in turn, beam 501 responds to that vibration, primarily at the natural frequency of beam 501. Therefore, the response of beam 501 is principally due to vibration at or near the resonant frequency of beam 501. The adjustable beam 501 is excited in a vertical mode so that the end of the adjustable beam 501 distal from the mounting member 504 vibrates in a vertical direction, indicated by arrow V. When enough energy is absorbed from the plate 508 by adjustable beam 501, the weight 505 that is affixed to the end of the adjustable beam 501 by nut 506 impacts the vibration stop 507 to create a shock pulse, thereby creating a high frequency vibration spectrum. The length of the adjustable beam 501 (shown as a threaded rod element) can be adjusted by use of the nuts 502, 503 that enable the threaded rod that comprises the adjustable beam 501 to be lengthened or shortened. Similarly, the mass of the weight 505 that is removably mounted on the distal end of the adjustable beam 501 can be selected to create impacts of magnitude and frequency desired by the test engineer. The adjustable stop can comprise or include a programmer 509 to shape the vibration spectrum that is generated by the action of the tuned energy redistribution system.

An alternate tuned energy redistribution system is shown in FIG. 3 and comprises the combination of an adjustable beam 601 and vibration stop 605 that are directly connected to the plate 606. The plate 606 transmits energy that is received from the actuators 105 (and/or the coupling module 102 or from additional vibration inputs from sources directly mounted on plate 606) and, in turn, beam 601 responds to that vibration, primarily at the natural frequency of beam 601. Therefore, the response of beam 601 is principally due to vibration at or near the resonant frequency of beam 601. The adjustable beam 601 is excited in a vertical mode so that the end of the adjustable beam 601 distal from the mounting member 607 vibrates in a vertical direction, indicated by arrow V. When enough energy is absorbed from the plate 606 by adjustable beam 601, the weight 603 that is affixed to the end of the adjustable beam 601 vibrates over a sufficient range of motion to close gap 604 and impact the vibration stop 605 to create a shock pulse, thereby creating a high frequency vibration spectrum. The length of the adjustable beam 601 can be adjusted by selecting a particular length beam element 601. The thickening at the end of the adjustable beam 601 where is attached to the mounting member 607 is provided to avoid a high stress concentration that would shorten the life of the tuned absorber. Similarly, the mass of the weight 603 that is removably mounted on the distal end of the adjustable beam 601 can be selected to create impacts of magnitude and frequency desired by the test engineer. The weight 603 can be implemented to include an adjustable nut to thereby enable the adjustment of the range of vibration that is possible. The vibration stop 605 can comprise or include a programmer 608 to shape the vibration spectrum that is generated by the action of the tuned energy redistribution system.

Figure 4:
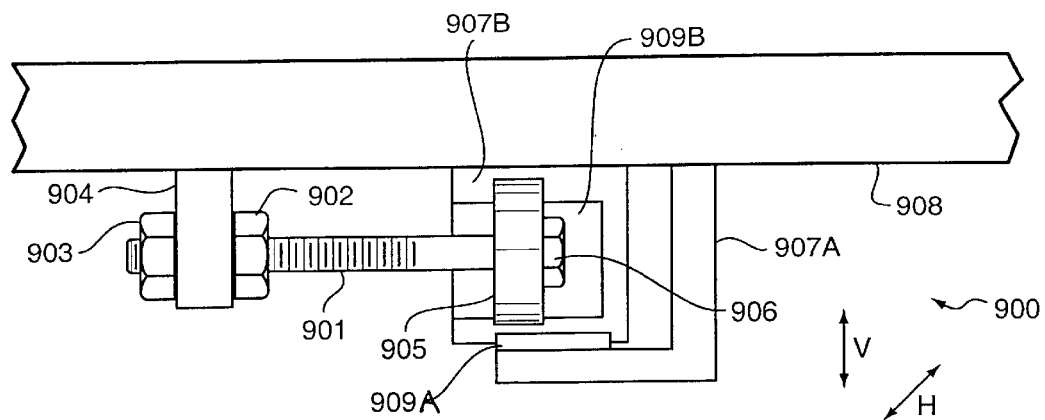
FIG. 4 illustrates a cross-section view of a tuned energy redistribution system that operates to control vibrations in multiple dimensions.

Alternatively, as shown in FIG. 4, the tuned energy redistribution system can use an adjustable beam 901 that is rectangular in cross section and therefore has different resonant frequencies in two different (orthogonal) directions, as well as vibration stops 907A, 907B and programmers 909A, 909B in both directions. Thus, in the vertical direction V the adjustable beam 901 can have a resonant frequency f1 while in an orthogonal direction H (perpendicular to the surface of FIG. 4) the adjustable beam 901 can have a resonant frequency f2, where f1≠f2. This enables the user to program the tuned energy redistribution system in each of the two orthogonal directions. As noted, tuned energy redistribution system 900 comprises the combination of an adjustable beam 901 and vibration stop 907 that are directly connected to the plate 908. The plate 908 transmits energy that is received from the actuators 105 (and/or the coupling module 102 or from additional vibration inputs from sources directly mounted on plate 908) and, in turn, beam 901 responds to that vibration, primarily at the natural frequencies of beam 901. Therefore, the response of beam 901 is principally due to vibration at or near the resonant frequencies of beam 901. The adjustable beam 901 is excited so that the end of the adjustable beam 901 distal from the mounting member 904 vibrates in directions, indicated by arrows V, H. When enough energy is absorbed from the plate 908 by adjustable beam 901, the weight 905 that is affixed to the end of the adjustable beam 901 by nut 906 impacts the vibration stops 907A,B to create a shock pulse, thereby creating a high frequency vibration spectrum. The length of the adjustable beam 901 can be adjusted by use of the nuts 902, 903 that enable the threaded rod that comprises the adjustable beam 901 to be lengthened or shortened. Similarly, the mass of the weight 905 that is removably mounted on the distal end of the adjustable beam 901 can be selected to create impacts of magnitude and frequency desired by the test engineer. The vibration stops 907A,B can comprise or include a programmer 909A,B to shape the vibration spectrum that is generated by the action of the tuned energy redistribution system.

The tuned energy redistribution systems, if very lightly damped, respond very strongly to frequencies near to the resonant frequency of the tuned energy redistribution system, but respond very little to other frequencies. This means that vibration energy input at the natural frequency of the tuned energy redistribution system can be controlled by the response of the secondary shaker module 103 to the vibration energy input by the primary shaker module 101 at low frequencies. For example, assume that the tuned energy redistribution system resonates at 100 Hz and that the damping of the tuned energy redistribution systems is very small. In that case, the tuned energy redistribution systems respond mostly to frequencies very near 100 Hz. Therefore, the primary shaker module response very near 100 Hz dictates the response of the tuned energy redistribution systems. Therefore, the spectrum control at 100 Hz on the primary shaker module 101 essentially controls the response of the tuned energy redistribution systems which, in turn, controls the broad band high frequency vibrations of the secondary shaker module 103. The input spectrum to the primary shaker module 101 can be reduced on both sides of 100 Hz in order to keep the spectrum on the primary shaker module 101 from becoming too high in that range when measured over the half power bandwidth of a moderately damped system.

Figure 8:
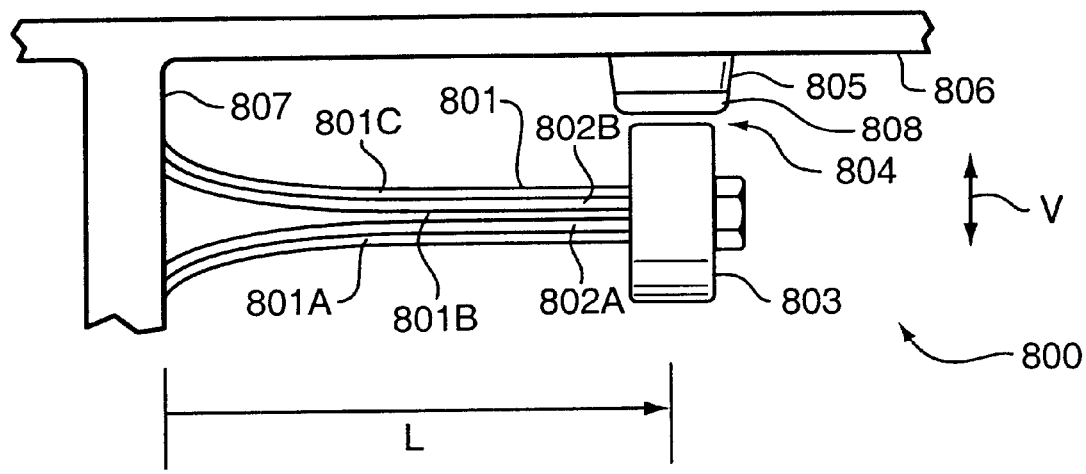
FIG. 8 illustrates another embodiment of a tuned energy redistribution system that uses a constrained layer damper.

FIG. 8 illustrates another embodiment of a tuned energy redistribution system that uses a constrained layer damper to shape the response curve of the damper to controllably redistribute the vibrations in a vibrating system. Tuned energy redistribution system 800 comprises the combination of an adjustable leaf spring 801 and vibration stop 805 that are directly connected to the plate 806. The plate 806 transmits energy that is received from the actuators 105 (and/or the coupling module 102 or from additional vibration inputs from sources directly mounted on plate 806) and, in turn, leaf spring 801 responds to that vibration, primarily at the natural frequency of leaf spring 801. Therefore, the response of leaf spring 801 is principally due to vibration at or near the resonant frequency of leaf spring 801. The adjustable leaf spring 801 is excited in a vertical mode so that the end of the adjustable leaf spring 801 distal from the mounting member 807 vibrates in a vertical direction, indicated by arrow V. When enough energy is absorbed from the plate 806 by adjustable leaf spring 801, the weight 803 that is affixed to the end of the adjustable leaf spring 801 vibrates a sufficient amount to traverse gap 804 and impacts the vibration stop 805 to create a shock pulse, thereby creating a high frequency vibration spectrum. The characteristics of the adjustable leaf spring 801 can be adjusted by use of the vibration absorbers 802A, 802B inserted between the layers 801A, 801B, 801C of leaf spring 801 that enable the vibration characteristics of leaf spring 801 to be adjusted. Similarly, the mass of the weight 803 that is removably mounted on the distal end of the adjustable leaf spring 801 can be selected to create impacts of magnitude and frequency desired by the test engineer. The adjustable stop can comprise or include a programmer 808 to shape the vibration spectrum that is generated by the action of the tuned energy redistribution system.

Programmers

The operation of the tuned energy redistribution systems 500, 600, 800, 900 described above can be modified by the use of programmers, such as 509, 608, 808, 909. Programmers comprise coatings that have predetermined physical characteristics that change the bandwidth of the vibration frequencies that are produced. For example, the vibration frequency spectrum that results from the shock pulse generated by a tuned energy redistribution system can be shaped by placing a programmer between the impacting mass and the table. For this purpose, Delrin® acetal resins are the preferred material although other materials, such as those used to manufacture roller blade wheels, are also appropriate due to their resiliency. These materials typically generate more low frequency vibrations than the Delrin materials due to the fact that they are softer materials. The Delrin acetal resins produced by Dupont are crystalline thermoplastic homopolymers made by the polymerization of formaldehyde. The beneficial characteristics of Delrin acetal resins are: high mechanical strength and rigidity, high fatigue endurance, high resistance to repeated impact, low coefficient of friction, excellent dimensional stability. The physical dimensions and material properties of the programmer determine the stiffness and therefore the pulse shape, which need not be half sine.

Implementation of a Tuned Energy Redistribution System

The present tuned energy redistribution system operates in a dual mode paradigm wherein the tuned energy redistribution system operates as a tuned absorber until the mass strikes the stop which may be coated with the optional programmer. At this time, a nearly elastic impact and rebound occurs. The impact of the mass striking the vibration stop supplies a pulse input to the point of attachment of the tuned energy redistribution system to the multi-level vibration test system 100 and changes the velocity of the mass with a relatively small loss of relative velocity. The pulse shape generated by this impact determines the bandwidth of the resulting vibration in the element of the multi-level vibration test system 100 that was struck by the mass.

While the operation of the tuned energy redistribution system appears straightforward, a precise mathematical analysis of the tuned energy redistribution system is impractical or even impossible. This is due to the fact that a series of impacts, spaced apart in time at regular intervals can be represented by a series of spectral lines in the frequency domain, with an infinite series of spectral lines in the frequency domain being obtained when the distances between the input pulses goes to infinity. However, in the present case, the impacts are not at regular intervals due to the random vibration of the multi-level vibration test system 100. An irregular series of pulses, resulting from the random vibration, generate a smeared line spectrum, where the spectral lines move back and forth in the frequency domain. Therefore, the operation of the tuned energy redistribution system cannot be precisely defined mathematically due to the lack of a predetermined and regular vibration of the multi-level vibration test system 100. In operation, the dynamic response of the tuned absorber mode of operation of the tuned energy redistribution system can be characterized using linear theory until an impact occurs. At this point, the computations change to represent the impulse nature of this impact. The impact of the tuned absorber mass is small in magnitude because the change in vibrational displacement of the mass in the cycle in which contact occurs is only due to the change in vibrational displacement over the last cycle. Using impulse-momentum theory, the changes in velocities in the multi-level vibration test system 100 and mass can be calculated. The mass and the shaker table both experience an impulsive change in velocity, which is difficult to compute in the case of the shaker table. The multi-level vibration test system 100 and the tuned energy redistribution system both revert to a normal vibration mode using normal vibration theory for the shaker and a constant linear velocity for the mass, as modified by shaker motion until another impact occurs. There is a six axis motion in the multi-level vibration test system 100 and the degree of complexity of the resultant computations is overwhelming.

Figure 9:
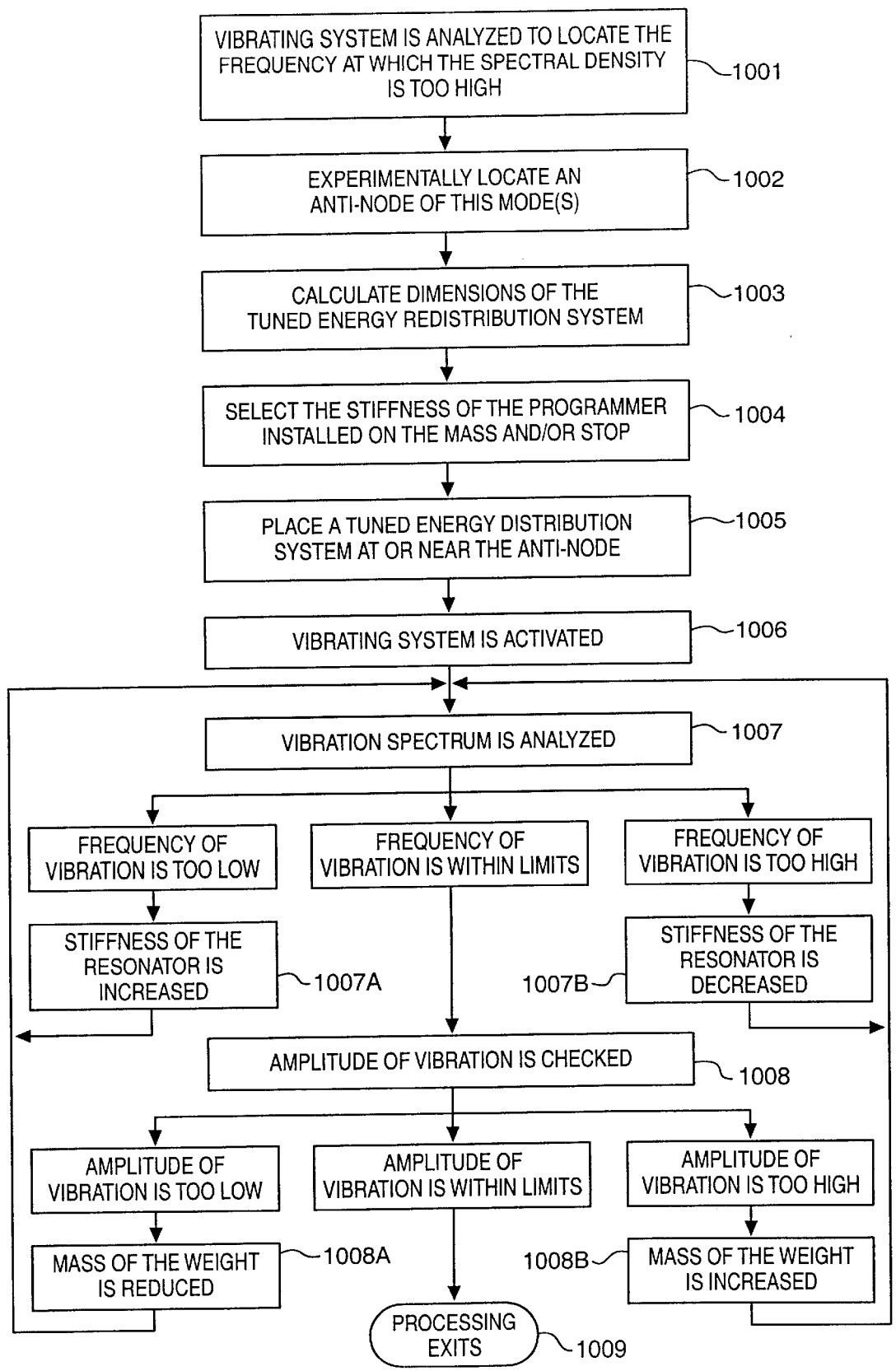
FIG. 9 illustrates in flow diagram form the process used in the selection of a typical tuned energy redistribution system.

Therefore, a practical method, such as that illustrated in flow diagram form in FIG. 9, is required to enable a user to determine the necessary characteristics of the tuned energy redistribution system. In operation, the shaker table, with the system under test 104 attached thereto, is analyzed at step 1001 to locate the frequency or frequencies on the shaker table that have a spectral density, representative of a vibration frequency, that is too high. The operator then experimentally locates an anti-node(s) of the mode(s) of this frequency at step 1002 and places a tuned energy redistribution system at or at least near this location at step 1005. The tuned energy redistribution system is designed to match the natural frequency of the mode to be damped. The dimensions of the tuned energy redistribution system can be calculated at step 1003 by assuming that the vibrating mass is a tip mass on a cantilever beam, with allowance for the beam mass. A simple solution to this computation task is to place approximately 24% of the beam mass at the tip of the cantilever beam for calculation purposes. A large mass causes a large change in the frequency response of the mode and a small mass causes a small change.

For a multi-level vibration test system which produces random vibrations to test the vibration resilience of products mounted on a shaker table, the tuned energy redistribution system is tuned to (or near) a resonant frequency, or any frequency of vibration whose amplitude is higher than that desired. The tuned energy redistribution system absorbs energy at its own resonant frequency and the response builds up until the vibrating mass within the tuned energy redistribution system hits the vibration stop and an impulse is given to the shaker table. A single impulse generates an infinite series of line spectra in the frequency domain as defined by a Fourier analysis. An irregularly timed series of impulses generates a series of infinite series of line spectra in the frequency domain. Thus, energy is extracted by the tuned energy redistribution system at the resonant frequency, or any frequency of vibration of amplitude higher than that desired and then redistributed over a very broad bandwidth which is determined by the selection at step 1004 of the stiffness of the programmer on the mass and/or stop. A very stiff programmer generates a very broad spectrum and a very soft programmer generates a narrow spectrum. Since pneumatically activated shakers are very weak in low frequencies, a resonance in the shaker table can be redistributed to the low frequencies by the use of a soft programmer, while a stiff programmer generates a very broad bandwidth of spectral lines. Thus, the tuned energy redistribution system can reduce resonances or other frequencies and fill in the low frequency end of the spectrum.

At step 1006, the vibrating system is activated and at step 1007 the vibration spectrum is analyzed. If the frequency of vibration is too low, at step 1007A the stiffness of the resonator (beam in this example) is increased and processing returns to step 1007. If the frequency of vibration is too high, at step 1007B the stiffness of the resonator is decreased and processing returns to step 1007. If the frequency of vibration is within limits, processing advances to step 1008 where the amplitude of vibration is checked. If the amplitude of vibration is too low, at step 1008A the mass of the weight is reduced and processing returns to step 1007. If the amplitude of vibration is too high, at step 1008B the mass of the weight is increased and processing returns to step 1007. If the amplitude of vibration is within limits, processing exits at step 1009.

SUMMARY

The tuned energy redistribution system for a vibration test system comprises vibration input elements and/or vibration shaping elements that collectively function to enable the user to program the frequency and magnitude of the vibrations that are produced by the vibration test system. This energy redistribution is accomplished by providing tuned absorbers, consisting of a vibrating mass and a vibration stop, which shape the frequency response of the vibration system by responding to frequencies mostly near their natural frequency of vibration and then, when the response displacement is sufficient, provide a vibration input by impacting the element in the vibration system to which they are connected via the vibration stop, causing broad band vibration to be generated by the series of impacts.

The tuned energy redistribution system can be linear or angular in nature and can be of many different configurations, only a few of which have been noted above. In addition, the device or mass from which the energy is extracted can be any device or mass having an amplitude of vibration at a particular frequency that is too great and in a particular direction(s). There are many such instances of vibrating systems and problems occurring in vibrating systems, such as: axle hop on a motor vehicle caused by a corduroy road; or axle trounce in a motor vehicle caused by extreme acceleration where the springs wind up, the axle and tires rapidly rotate, followed by the tires regaining traction, and the process repeats; or steel mill where extruded semi-liquid steel vibrates as it is output from the furnace causing irregularities in the steel; or air-conditioner compressor vibration during start up.

What is claimed:

1. A method of mounting a tuned energy redistribution system on a vibrating system to cause broad band vibration to be generated in said vibrating system, said method of mounting a tuned energy redistribution system on a vibrating system comprising the steps of:

locating a mode on the vibrating system that has a frequency at which a spectral density is too high;

identifying a location of an anti-node of said frequency at which a spectral density is too high on the vibrating system; and mounting said tuned energy redistribution system at or near this location.

2. The method of mounting a tuned energy redistribution system on a vibrating system of claim 1 further comprising the step of:

designing said tuned energy redistribution system to vibrate at or near a natural frequency of vibration of the mode to be damped.

3. The method of mounting a tuned energy redistribution system on a vibrating system of claim 2 wherein said step of designing comprises:

assuming that said tuned energy redistribution system includes a vibrating mass that comprises a tip mass on a cantilever beam; and placing approximately 24% of the total mass of said tip mass and said cantilever, at the tip of said cantilever beam for calculation purposes.

4. The method of mounting a tuned energy redistribution system on a vibrating system of claim 3 further comprising the step of:

directly connecting a vibration stop to said vibrating system a predetermined adjustable distance from said vibrating mass when said vibrating mass is devoid of vibration, for impacting said vibrating mass when said vibrating mass vibrates a displacement equal to said predetermined adjustable distance cause broad band vibration to be generated in said vibrating system at said predetermined location on said vibrating system by said vibration stop means impacting said vibrating mass; and changing the predetermined adjustable distance to determine the damping effect of said vibration to determine whether the size of said tip mass attached to said cantilever beam is appropriate.

5. The method of mounting a tuned energy redistribution system on a vibrating system of claim 4 further comprising the step of:

changing said cantilever beam to accompany a change in said vibrating mass in order to obtain a desired natural frequency of vibration.

6. A tuned energy redistribution system that is operational in a vibrating system to produce vibrations at a predetermined set of frequencies, said tuned energy redistribution system comprises:

an adjustable beam means, directly connected to said vibrating system at or near a predetermined location on said vibrating system, said location comprising an anti-node of a frequency at which a spectral density is too high on the vibrating system, for vibrating at frequencies at or near a natural resonant frequency of said predetermined location on said vibrating system in response to vibration of said vibrating system; and vibration stop means, directly connected to said vibrating system at a predetermined adjustable distance from said adjustable beam means when said adjustable beam means is devoid of vibration, for impacting said adjustable beam means when said adjustable beam means vibrates a displacement equal to said predetermined adjustable distance cause broad band vibration to be generated in said vibrating system at said predetermined location on said vibrating system by said vibration stop means impacting said adjustable beam means.

7. The tuned energy redistribution system of claim 6 further comprising:

programmer means located between said adjustable beam means and said vibration stop means for shaping a vibration spectrum generated by said vibration stop means impacting said adjustable beam means.

8. The tuned energy redistribution system of claim 6 wherein said tuned energy redistribution system vibrates at or near the natural frequency of vibration to be damped.

9. The tuned energy redistribution system of claim 8 wherein said adjustable beam means includes a vibrating mass that comprises a tip mass on a cantilever beam where approximately 24% of the total mass of said tip mass and said cantilever, is placed at a tip of said cantilever beam for calculation purposes.

10. The tuned energy redistribution system of claim 9 further comprising:

means for changing the predetermined adjustable distance to control a damping effect of said vibration to determine whether the size of said tip mass attached to said cantilever beam is appropriate.

11. A method of mounting a tuned energy redistribution system on a vibration test system to subject a product under test to vibrations of predetermined frequencies, wherein said vibration test system comprises a shaker module, for producing vibrations at or near a predetermined set of frequencies, and a fixture on which said product under test is mounted, wherein said tuned energy redistribution system comprises a vibrating mass mounted on a cantilever beam which is directly connected to said fixture at a predetermined location on said fixture, for vibrating at frequencies at or near a natural resonant frequency of said predetermined location on said fixture in response to vibration of said fixture, and a vibration stop, directly connected to said fixture a predetermined adjustable distance from said mass when said cantilever beam is devoid of vibration, for impacting said mass when said mass vibrates a displacement equal to said predetermined adjustable distance to cause broad band vibration to be generated in said fixture at said predetermined location on said fixture by said impact, said method of mounting a tuned energy redistribution system on a vibration test system comprising the steps of:

locating a mode on the shaker module that has a vibration frequency whose spectral density is too high;

identifying a location of an anti-node of said vibration frequency at which said spectral density is too high on the shaker module; and mounting said tuned energy redistribution system at or near said location of said anti-node.

12. The method of mounting a tuned energy redistribution system on a vibration test system of claim 11 further comprising the step of:

designing said tuned energy redistribution system to vibrate at or near a natural frequency of vibration of the mode to be damped.

13. The method of mounting a tuned energy redistribution system on a vibration test system of claim 12 wherein said step of designing comprises:

assuming that the vibrating mass is a tip mass on said cantilever beam, with allowance for the beam mass; and placing approximately 24% of the total mass of said tip mass and said cantilever, at a tip of said cantilever beam for calculation purposes.

14. The method of mounting a tuned energy redistribution system on a vibration test system of claim 13 further comprising the step of:

directly connecting a vibration stop to said vibrating system at a predetermined adjustable distance from said vibrating mass when said vibrating mass is devoid of vibration, for impacting said vibrating mass when said vibrating mass vibrates a displacement equal to said predetermined adjustable distance cause broad band vibration to be generated in said vibrating system at said predetermined location on said vibrating system by said vibration stop impacting said vibrating mass; and changing the predetermined adjustable distance to determine a damping effect of said vibration to determine whether the size of said tip mass attached to said cantilever beam is appropriate.

15. The method of mounting a tuned energy redistribution system on a vibration test system of claim 14 further comprising the step of:

changing said cantilever beam to accompany a change in said vibrating mass in order to obtain a desired natural frequency of vibration.

16. A tuned energy redistribution system that is operational in a vibration test system to subject a product under test to vibrations of predetermined frequencies, wherein said vibration test system comprises a shaker module, for producing vibrations at a predetermined set of frequencies, and a fixture on which said product under test is mounted, said tuned energy redistribution system comprises:

an adjustable beam means, directly connected to said fixture at or near a predetermined location on said fixture, said location comprising an anti-node of a frequency at which a spectral density is too high on the vibration system, for vibrating at frequencies at or near a natural resonant frequency of said predetermined location on said fixture in response to vibration of said fixture; and vibration stop means, directly connected to said fixture a predetermined adjustable distance from said adjustable beam means when said adjustable beam means is devoid of vibration, for impacting said adjustable beam means when said adjustable beam means vibrates a displacement equal to said predetermined adjustable distance cause broad band vibration to be generated in said fixture at said predetermined location on said fixture by said vibration stop means impacting said adjustable beam means.

17. The tuned energy redistribution system of claim 16 further comprising:

programmer means located between said adjustable beam means and said vibration stop means for shaping a vibration spectrum generated by said vibration stop means impacting said adjustable beam means.

18. The tuned energy redistribution system of claim 16 wherein said tuned energy redistribution system vibrates at or near the natural frequency of vibration to be damped.

19. The tuned energy redistribution system of claim 18 wherein said adjustable beam means includes a vibrating mass that comprises a tip mass on a cantilever beam where approximately 24% of the total mass of said tip mass and said cantilever, is placed at a tip of said cantilever beam for calculation purposes.

20. The tuned energy redistribution system of claim 16 further comprising:

means for changing the predetermined adjustable distance to control the damping effect of said vibration to determine whether the size of said tip mass attached to said cantilever beam is appropriate.

* * * * *